June 22, 1926.
C. JOHNSON
1,589,534
VALVE MOTION
Filed Sept. 15, 1921   3 Sheets-Sheet 2
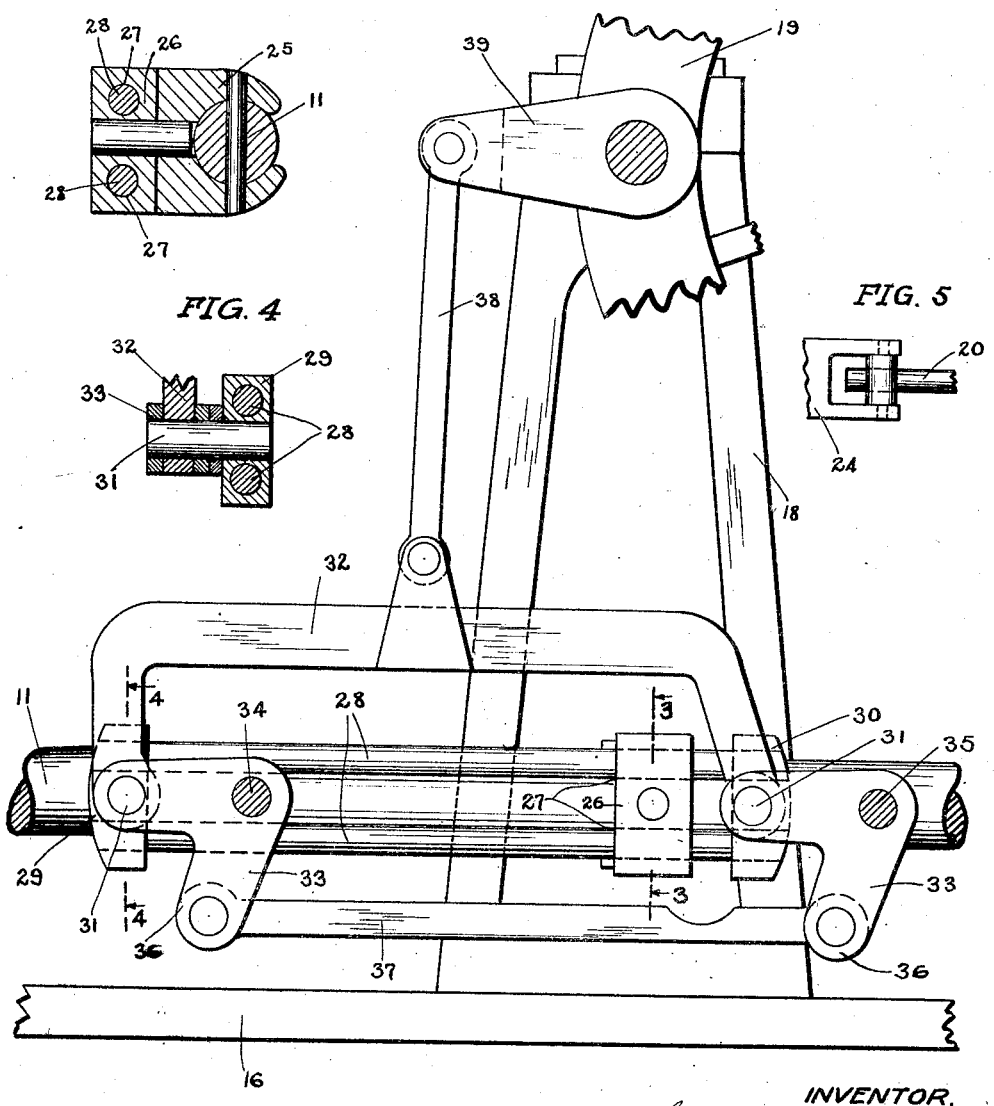

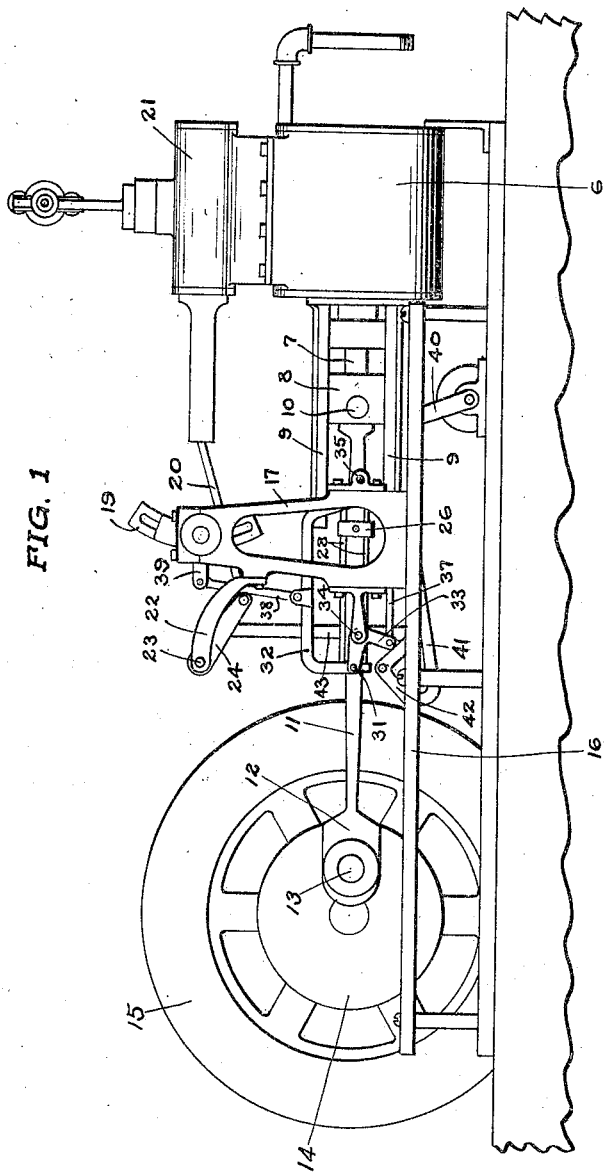

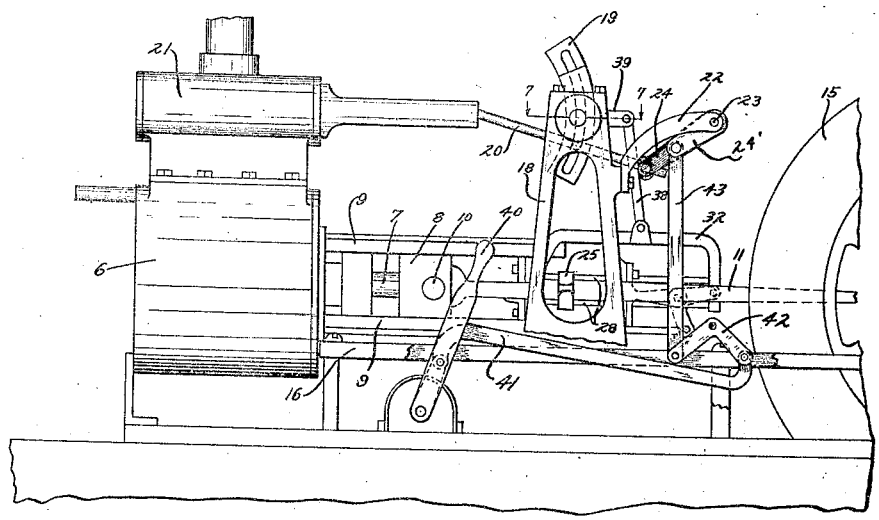

Patented June 22, 1926.

1,589,534

UNITED STATES PATENT OFFICE.

CARL JOHNSON, OF MILWAUKEE, WISCONSIN.

VALVE MOTION.

Application filed September 15, 1921. Serial No. 500,804.

This invention relates to improvements in valve motions for steam engines.

It is one of the objects of the present invention to provide a valve having improved means for regulating the movement thereof.

A further object of the invention is to provide a valve which is operated from the connecting rod.

A further object of the invention is to provide a valve, the motion to which is transmitted from the connecting rod by series of coordinating links.

A further object of the invention is to provide a valve motion in which the admission of steam ceases before the termination of the piston stroke thereby causing the cut-off to be very rapid.

A further object of the invention is to provide a link motion valve for steam engines which is of simple construction, is strong and durable and is well adapted for the purposes described.

With the above and other objects in view, the invention consists of the improved valve motion and its parts and combinations as set forth in the claims, and all equivalents thereof.

In the accompanying drawings in which the same reference characters indicate the same parts in all of the views:

Fig. 1 is a side view of a steam engine embodying the invention;

Fig. 2 is an enlarged view of a portion of Fig. 1 showing the valve motion;

Fig. 3 is a transverse sectional view taken on line 3—3 of Fig. 2 and on a larger scale;

Fig. 4 is a transverse sectional view taken on line 4—4 of Fig. 2 and on a larger scale;

Fig. 5 is an enlarged top view of the U-bracket showing the means for carrying the extremity of the valve shaft.

Fig. 6 is a fragmentary view of the steam engine taken on the opposite side from that shown in Fig. 1 and on a larger scale; and Fig. 7 is a sectional view taken on line 7—7 of Fig. 6 and on a larger scale.

Referring to the drawings, the numeral 6 indicates the cylinder of a steam engine provided with the usual piston (not shown). The piston carries a piston rod 7 which has a cross head 8 longitudinally, slidably movable between guides 9. Pivotally connected to cross head 8 as at 10 is the connecting rod 11 whose other extremity carries an enlarged end 12 and is pivotally connected to a crank pin 13 carried by disc 14. On the shaft with the disc 14 is the fly wheel 15.

A frame 16 is provided and said frame has mounted thereon, on opposite sides of said connecting rod 11, a pair of upright supporting standards 17 and 18. Said standards have pivotally mounted therebetween and near their upper extremities an arc-shaped rocker link 19 having an arc-shaped slot adapted to hold the link block of the valve rod 20 operating the valve within the valve housing 21. Mounted on the edges of said standards 17 and 18 are a pair of arms 22 carrying a short shaft 23 therebetween. Pivotally mounted on short shaft 23 and keyed thereto is a U-bracket 24 adapted to slidably carry the extremity of valve rod 20.

Motion is transmitted from the connecting rod 11 to the rocker link 19 and thence to the valve rod 20 by a series of co-acting links, the arrangement of which is as follows: Connecting rod 11 carries a small block 25 having attached thereto a second block 26 provided with two openings 27 parallel to said connecting rod. These openings 27 slidably receive a pair of rods 28 whose extremities are secured together by bands 29 and 30. Said bands carry outwardly extending fixed pins 31, which in turn carry a fixed U-shaped link 32 and pivotal angle links 33. The mid portions of said angle links 33 are connected to extensions of standard 17 as at 34 and 35 while the arms 36 pivotally carry a connecting link 37. Connected to the U-shaped link 32 at approximately a right angle is a vertical link 38 which pivotally connects with an arm 39 and said arm in turn is fixedly connected with said rocker link 19.

The device is further provided with lever means 40 which has connected thereto a series of links 41, 42 and 43, the link 43 being connected with the short shaft 23 by a pivotally secured arm 24' which is keyed to the shaft 23 and by which means, U-bracket 24 is pivoted to swing upwardly or downwardly thereby moving the position of valve rod 20 within rocker link 19 and thus giving the valve a neutral position, or a forward or reverse movement.

The operation of the valve gear, the valve being an internal valve is as follows: Assuming that the parts are in a starting position as shown in Fig. 1 with the piston in its head end position within the cylinder and that the fly wheel 15 is caused to revolve in a clock-wise direction, as the crank pin moves to its lowermost position, the block 26 will exert a downward thrust and the U-shaped link 32 and vertical link 38 will be dropped to lower the arm 39 and rock the link 19 to a position wherein its upper end is to the left of the position shown in Fig. 1. This movement of the link 19 will cause a movement of the valve rod to move the valve to the right in Fig. 1 to its inner end position, when the valve is adjusted for a forward movement. Hence, when the crank pin reaches its lowermost position the piston will have an intermediate position within the cylinder, and the valve will be at its inner end position.

During the movement of the crank pin upwardly to its furthest position to the left in Fig. 1, the piston will, of course, move to its crank end position. During the first half of this movement, there is no substantial movement of the block 26, but near the end of the piston's stroke an upward thrust is exerted by the block to raise all of the links and rock the rocker link 19 so that its lower end is moved to the left in Fig. 1 with the result that the valve is moved partially to the left in Fig. 1 toward its outer end position.

As the fly wheel revolves to move the crank pin to its uppermost position, the piston moves to a dead center position. The block 26 still exerts an upward thrust so during this movement the lower end of the link 19 is moved further to the left to move the valve to the left in Fig. 1 to its outer end position.

While the crank pin moves from its uppermost position to its furthest position to the right in Fig. 1, the piston is returned to its head end position. During the first half of this movement of the crank pin, no substantial movement of the block 26 occurs, so there is very little movement of the valve. During the latter half of the movement, however, a quick downward thrust is exerted by the block to lower the links and rock the lower end of the link 19 toward the right. This will move the valve toward the right toward its inner end position.

Thus, it will be seen that by the described link arrangement, the valve is operated quickly when the piston is at the end of its stroke and the valve is not moved during the main portion of the piston stroke. Hence, the admission of steam ceases before the termination of the piston stroke, and the steam, being cut off, is worked expansively. The cut off is very quick which is a desirable feature in steam engines.

From the above description it will be seen that the valve motion is well adapted for the purposes described.

What I claim as my invention is:

1. In combination with a steam engine including a valve rod and a connecting rod, a valve motion, comprising a pivotally connected block carried by said connecting rod, a rocker link pivotally connected to said valve rod, and a series of links connecting said block with said rocker link for transmitting motion from said connecting rod to said valve rod, said series of links comprising, angular oscillatory link members, connected together parallel rods connected to said link members, a U-shaped link member connected to both of the previously named set of link members, a vertical link member extending therefrom, and an arm connected thereto.

2. In combination with a steam engine including a valve rod and a connecting rod, a valve motion, comprising a pivotally connected block carried by said connecting rod, a rocker link pivotally connected to said valve rod, a series of links connecting said block with said rocker link for transmitting motion from said connecting rod to said valve rod, said series of links comprising angular oscillatory link members, connected together parallel rods, a U-shaped link member, a vertical link member, and an arm, and means for connecting said links together and holding them in spaced relation.

3. In combination with a steam engine including a valve rod and a connecting rod, a valve motion, comprising a pivotally connected block carried by said connecting rod, a rocker link pivotally connected to said valve rod, a series of links connecting said block with said rocker link for transmitting motion from said connecting rod to said valve rod, said series of links comprising angular oscillatory link members, connected together parallel rods, a U-shaped link member, a vertical link member, and an arm, and means for connecting said links together to produce coordinating movements thereof and for holding said links in spaced relation.

In testimony whereof, I affix my signature.

CARL JOHNSON.